Jan. 27, 1959  F. A. HILL  2,871,366
APPARATUS FOR SENSING RADIOACTIVITY
Filed Dec. 29, 1955  3 Sheets-Sheet 1
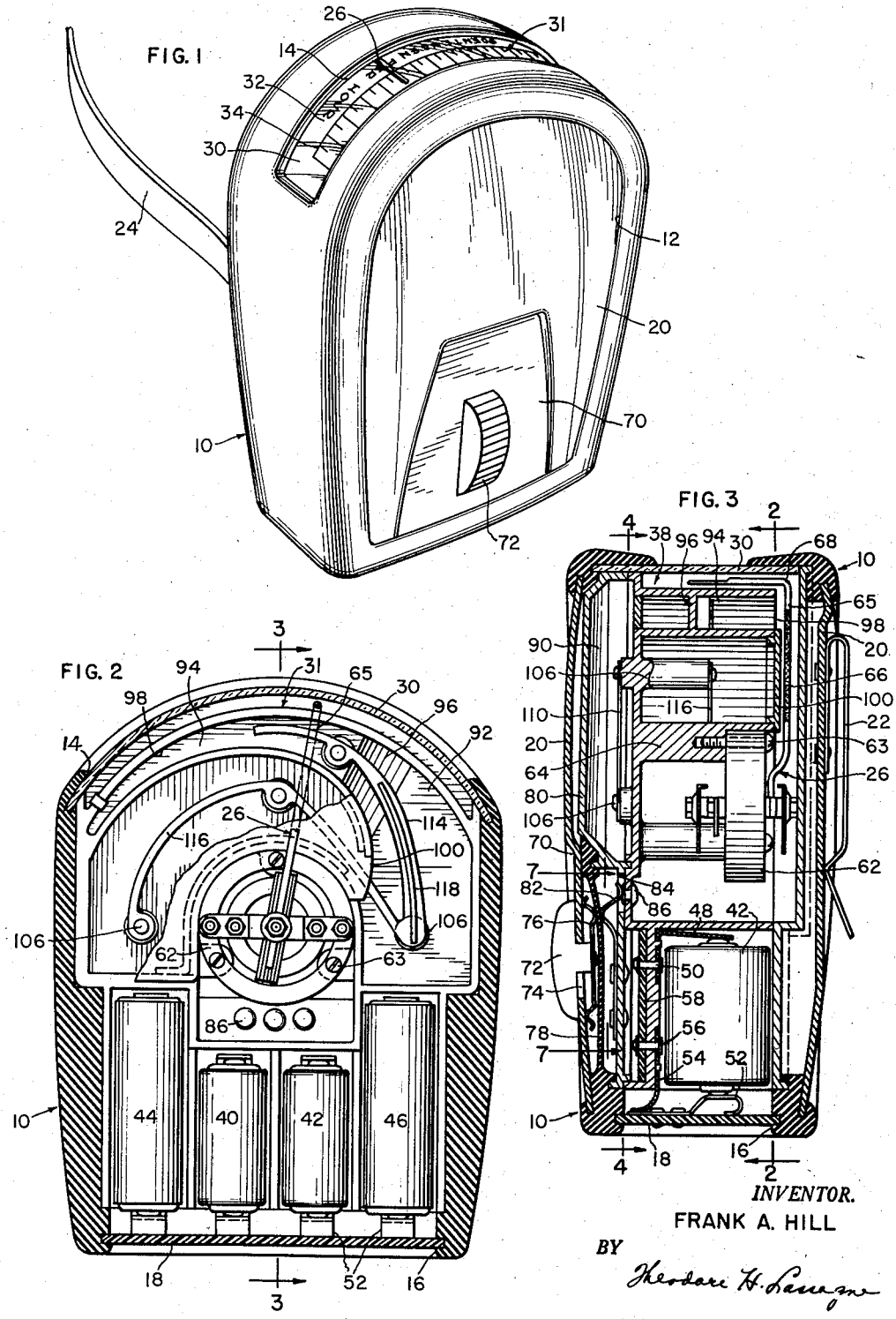
INVENTOR.
FRANK A. HILL
BY
*Theodore H. Lassen*
ATTORNEY

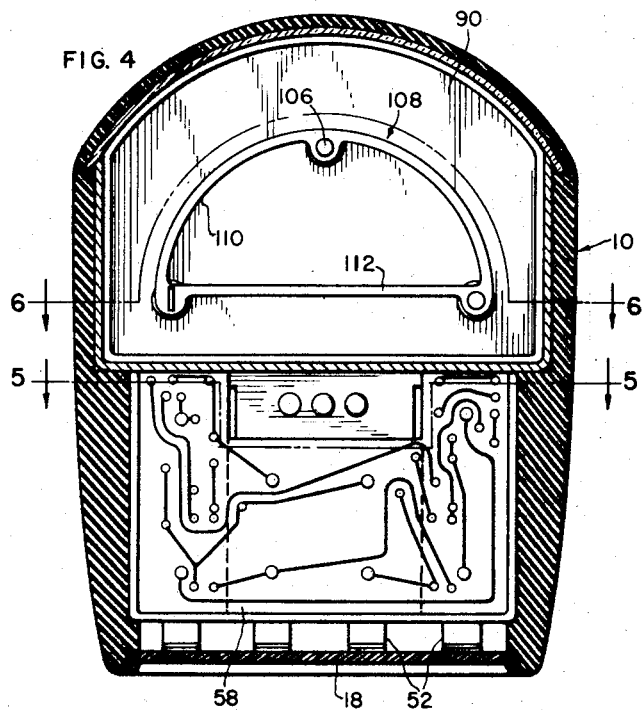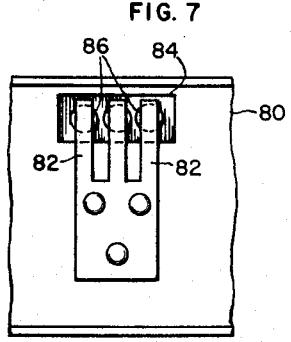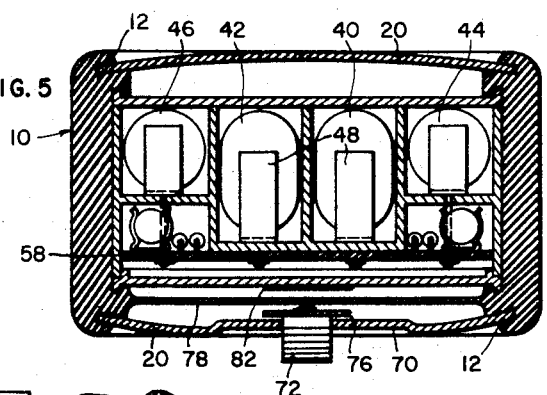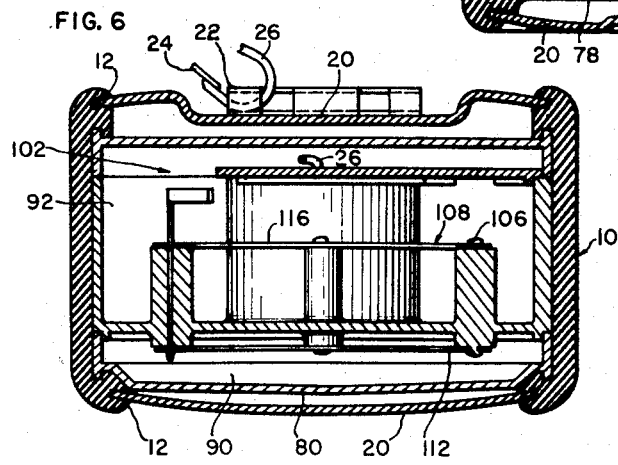

Jan. 27, 1959  F. A. HILL  2,871,366
APPARATUS FOR SENSING RADIOACTIVITY
Filed Dec. 29, 1955  3 Sheets-Sheet 3
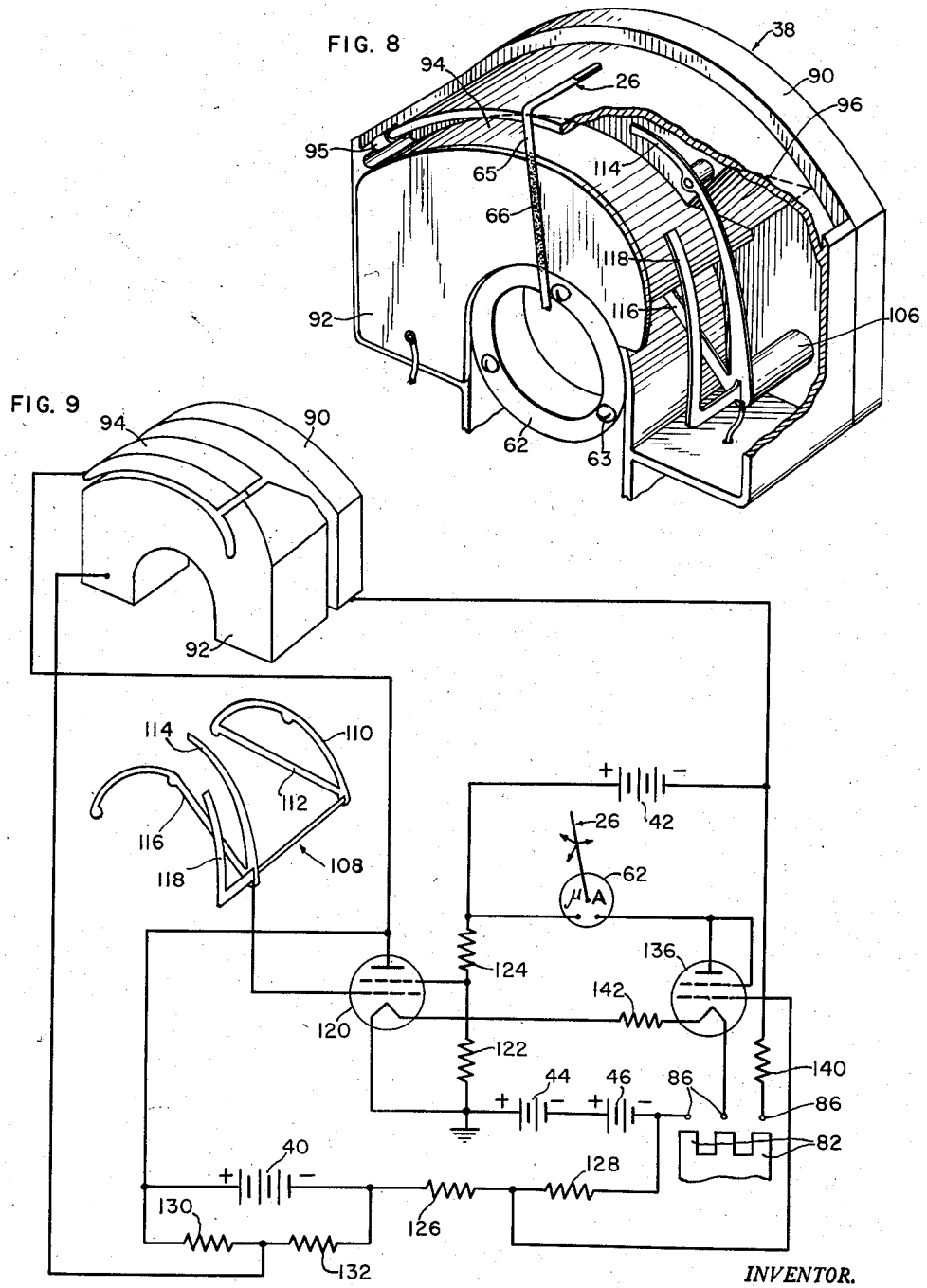
INVENTOR.
FRANK A. HILL
BY
Theodore H. Lassagne
ATTORNEY

United States Patent Office 2,871,366
Patented Jan. 27, 1959

2,871,366
APPARATUS FOR SENSING RADIOACTIVITY

Frank A. Hill, Van Nuys, Calif., assignor to Librascope, Incorporated, Glendale, Calif., a corporation of California Application December 29, 1955, Serial No. 556,294

17 Claims. (Cl. 250—83.6)

This invention relates to apparatus for sensing the intensity of radioactivity and more particularly to apparatus for using balancing techniques to sense the intensity of radioactivity and indicate such intensity.

In recent years, the principles of nuclear energy have been used to develop a wide variety of devices for peace time use. For example, power plants using nuclear energy have been developed to supply power to home and industry. The principles of nuclear energy have also been used to develop a wide variety of instruments for detecting and curing illnesses previously considered as beyond the reach of mankind. Because of the wide spread adaptation of nuclear energy for civilian uses, it is becoming extremely important to have an instrument which will indicate the intensity of radioactivity in an area instantaneously and reliably.

In co-pending application, Serial Number 448,676, filed August 9, 1954 by Frank A. Hill for "Radiac," now patent No. 2,797,332 dated June 25, 1957, apparatus is disclosed and claimed for sensing the intensity of radioactivity. The apparatus disclosed therein uses two ionization chambers. One chamber produces a signal in accordance with the intensity of radioactivity and actuates a sensing device in accordance with the signal produced. The sensing means acts to produce in the second chamber a number of charged particles dependent upon the extent of its actuation. By balancing the number of charged particles produced in the first and second chambers, the sensing means reaches a position representing the intensity of radioactivity. The sensing means may be employed to provide a visual indication of the intensity of radioactivity in the vicinity of the sensing apparatus, or it may be used to control the operation of other equipment such as nuclear or X-ray equipment.

The present invention provides sensing apparatus which uses three ionization chambers. A first one of the chambers receives the radioactive emanations and produces a corresponding number of charged particles of a first polarity. A second one of the chambers also receives the radioactive emanations and produces charged particles of a first polarity for low intensities of radioactivity and charged particles of the opposite polarity for high intensities of radio-activity. The charged particles from the first and second chambers control the positioning of a sensing device which carries radiation material for producing charged particles in the second and third chambers. Charged particles are produced in the third chamber by the radiation means at low intensities of radioactivity and are produced in the second chamber by the radiation means at high intensities of radioactivity. The number of charged particles produced in the second and third chambers by the radiation means at any instant is dependent upon the positioning of the sensing device.

By combining the flows of charge from the three ionization chambers, the sensing device becomes positioned to provide an accurate and reliable sensing of the intensity of radioactivity over a wide range of values. The response of the sensing device approaches a logarithmic basis in which the scale is expanded at the low end and contracted at the high end to produce a high accuracy of reading in all portions of the scale. The sensing means may respond to provide an indication as to the intensity of radioactivity or it may operate by its positioning to control the functioning of other equipment.

In the drawings:

Figure 1 is a perspective view of radiation-sensing apparatus constituting one embodiment of this invention as seen from a position in front of and somewhat above and to the left of the apparatus;

Figure 2 is a sectional view of the apparatus shown in Figure 1 and is taken substantially on the line 2—2 of Figure 3;

Figure 3 is a sectional view taken substantially on the line 3—3 of Figure 2 and illustrates in further detail certain components shown in Figures 1 and 2;

Figure 4 is a sectional view taken substantially on the line 4—4 of Figure 3;

Figures 5 and 6 are sectional views taken respectively on the lines 5—5 and 6—6 of Figure 4 and illustrate in further detail certain members shown in the previous figures;

Figure 7 is a somewhat enlarged fragmentary sectional view taken substantially on the line 7—7 of Figure 3 and illustrates in further detail certain members shown in Figure 3 for forming a switch;

Figure 8 is a perspective view somewhat schematically illustrating first, second and third ionization chambers and an associated indicator shown in the previous figures and is partly broken away to indicate the relative disposition of a collector associated with the various chambers and also shown in the previous figures; and Figure 9 illustrates in somewhat exploded relationship the collector and ionization chambers shown in Figure 8 and further illustrates in somewhat schematic relationship a circuit diagram of the electrical features forming a part of the invention.

In the embodiment of the invention shown in the drawings, a casing generally indicated at 10 (best seen in Figure 1) is preferably made from a resilient and shock-absorbing material such as rubber. The casing 10 is preferably open at the sides as indicated at 12, along a top strip as indicated at 14 and along a bottom portion as indicated at 16 in Figures 2 and 3. As may be best seen in Figure 1, the top of the casing 12 has an outwardly convex surface approximating a cylindrical configuration. The reason for this will be described in detail subsequently.

A bottom plate 18 made from a suitable insulating material extends into grooves at the bottom of the casing 10 to seal the opening 16. Similarly, cover plates 20 extend through the side openings 14 in the casing 10 and cooperate with lip portions in the casing to seal the side walls of the casing. A clip 22 is suitably attached as by rivets to one of the cover plates 20 and is provided with a suitable configuration to fit over the belt of a person so that it can be easily suspended from the belt and carried in this manner. A neck strap 24 (Figures 1 and 6) is also adapted to be supported as by hooks 26 in clip 22 and is disposed in looped configuration. By supporting the neck strap 24 in a looped configuration, the neck strap can be inserted over the head of a person and supported on the shoulders of the person. In this way, the apparatus constituting this invention can be carried around like a camera.

A transparent window 30 extends across the opening 14 at the top of the casing 10 and fits into grooves at opposite ends of the casing. The window 30 may be made from glass or preferably from a suitable material such as a methyl methacrylate commonly known under the trade name of "Lucite."

A dial 31 inscribed on the surface directly below the window 30 has a first portion 32 with no inscriptions except possibly a designation such as "Roentgens per hour" (best seen in Figure 1). This portion may be free of inscription to provide a quick and reliable indication as to the position of a pointer 26 disposed immediately below the window as shown in Figure 3. The dial 31 also has a second portion 34 on which a scale is provided. The scale preferably has a logarithmic relationship or a relationship approaching a logarithm and may have a suitable range such as approximately 0 to 50 Roentgens per hour.

The casing 10, the bottom plate 18, the cover plate 20 and the window 30 cooperates with one another to provide a sealed enclosure. A housing generally indicated at 38 is fixedly positioned within this enclosure. At its bottom end, the housing 38 is supported within sockets in the casing 10 and at its upper end the housing is disposed against the window 30. The housing 38 may be considered as divided into a number of compartments by a plurality of walls. These compartments are shaped to hold different components of the apparatus constituting this invention.

Batteries 40, 42, 44 and 46 (Figure 2) are disposed in separate compartments at the bottom of the housing 38. Each of the batteries 40 and 42 may be adapted to provide a suitable potential such as approximately 15 volts, and each of the batteries 44 and 46 may be adapted to provide a suitable potential such as approximately 3 volts. First electrical terminals 48 (Figure 3) are supported as by studs 50 on the housing 38 at one end. At their other end, the terminals 48 are positioned above the batteries 40, 42, 44 and 46 to make contact with terminals at the tops of the batteries. Second electrical terminals 52 are supported as by studs from the bottom plate 18 at one end. At their other end, the terminals 52 engage the terminals at the bottom of the batteries 40, 42, 44 and 46.

The terminals 52 on the bottom plate 18 are adapted to contact connectors 54 suitably attached to the housing 38 as by studs 56. The studs 56 as well as the studs 52 extend through the housing 38 and a plate 58 made from a material such as a phenol having properties of high insulation. Printed circuitry corresponding to that shown schematically in Figure 9 is adapted to be provided as by etching on the plate 58. Various terminals for the printed circuitry are obtained as by the studs 52 and 56.

An electromechanical transducer such as a meter 62 (Figures 2, 3, 8 and 9) is disposed in the housing 38 within a compartment above the batteries 40, 42, 44 and 46. The meter 62 is attached to the housing 38 as by screws 63 extending into rib portions 64 provided in the housing. The meter 62 has a rotatable shaft which supports the pointer 26 for pivotable movement. The pointer 26 has a first portion 65 extending upwardly from the meter shaft. Radioactive emanations 66 are provided on the portion 65 along substantially the full length of the portion for reasons which will be described in detail subsequently. The pointer 26 also has a second portion 68 extending integrally from the portion 65 and in substantially perpendicular relationship to the portion at a position immediately below the window 30.

As shown in Figures 1 and 3, one of the side covers 20 is provided with a recessed portion 70 near the bottom of the cover. A knob 72 is supported by the cover 20 in the recessed portion 70 and is slidable vertically in an elongated slot 74 (Figure 3) in the recessed portion. The knob 72 may be knurled as shown in Figure 1 to facilitate manual gripping. The knob 72 carries an actuator 76 having a hooked extremity for engaging a flexible diaphragm 78. The diaphragm 78 extends upwardly from the cover 10 in substantially integral relationship to the cover 10. Because of this integral relationship, the diaphragm 78 is made from the same resilient material such as rubber as the cover 10.

At its upper end, the diaphragm 78 is maintained in taut relationship between the side cover 20 and a tongue extending from a cap 80 (Figure 3). The diaphragm 78 in turn presses against a plurality of electrical fingers 82 (also shown in Figures 7 and 9). The fingers 82 have hooked extremities for extending through holes 84 in the cap 80 when the fingers have been raised. The hooked extremities of the fingers 82 are adapted to engage electrical terminals 86 when the fingers extend through the hole 84 in the cap 80. The fingers 82 and the terminals 86 form a manually operated master switch.

The cap 80 is supported by the casing 10 at its upper and lower ends. At an intermediate position, the cap 80 extends forwardly so as to become separated by a moderate distance from the housing 38 along its upper half. The cap 80 and the housing 38 cooperate with each other to form an ionization chamber 90 hereinafter to be designated as a "detecting" chamber. The detecting chamber 90 may be filled with a suitable gas such as air which is adapted to be ionized into charged particles such as electrons and positive ions when radioactive emanations penetrate into the chamber.

A pair of ionization chambers 92 and 94 (best seen in Figures 2, 8 and 9) are formed by the housing 38 in back of the detecting chamber 90. The chamber 92 will hereinafter be designated as an "intermediate" chamber and the chamber 94 will hereinafter be designated as a "balance" chamber. The balance chamber 94 is positioned above the intermediate chamber 92 and is provided with a curved configuration corresponding to the arcuate movement of the pointer 26. The balance chamber 94 has a configuration such that the cross-sectional area gradually increases with progressive pivotal movements of the pointer 26 from the low end of the scale 34 (Figure 1).

The balance chamber 94 is provided with top and bottom walls, with a front wall and with a side wall 96 (Figures 2, 3 and 8). The side wall 96 extends in an oblique direction as may be best seen in Figures 2 and 8. A clip 95 is connected to the upper wall of the balance chamber 94 to lead to the external parts of the apparatus static charges accumulating in the balance chamber. By including the clip 95, a static charge cannot build up between the walls of the balance chamber 94 and a collector hereinafter designated at 108 so as to affect the proper operation of these members.

The balance chamber 92 is open in the back as indicated at 98 in Figures 2 and 3. By maintaining the back wall of the balance chamber 94 open, emanations from the radioactive material 66 on the pointer 26 are able to enter the chamber and ionize molecules of gas in the chamber. The volume defined by the walls of the balance chamber 94 is considerably less than the volume of the detecting chamber 90. For example, the balance chamber 94 may have a volume of approximately 1 cubic inch when the detecting chamber has a volume of approximately 2.7 cubic inches.

The intermediate chamber 92 is provided with a volume greater than that of the detecting chamber 90. For example, the intermediate chamber 92 may have a volume of approximately 5.0 cubic inches. However, as will be explained in detail subsequently, the effective volume of the intermediate chamber 92 is actually slightly less than the effective volume of the detecting chamber 90. Along a first portion, the intermediate chamber 92 is defined by lower and upper surfaces having approximately arcuate configurations. This portion of the intermediate chamber 92 has a front wall and a back wall defined by a plate 100. By providing the plate 100, emanations from the radioactive material 66 from the pointer 26 are prevented from penetrating into the chamber 92 during the movements of the pointer 26 through the low and intermediate ranges of the scale 34 in Figure 1.

The intermediate chamber 92 has a relatively large volume at the high end of the scale 34. This results from the fact that the balance chamber 94 does not occupy any space at the high end of the scale 34. In this scale range, the back wall of the chamber 92 is open such as indicated at 102 in Figure 6. Because of this, emanations from the radioactive emanations 66 on the pointer 26 are able to enter into the chamber 92 at the high end of the scale 34.

A plurality of studs 106 (Figures 2, 3, 4 and 6) extend from the housing 38 at spaced intervals. The studs 106 may have flattened heads to retain in fixed position a collector generally indicated at 108. The collector 108 may be made from a suitable material such as cardboard which is coated with a suspension of carbon particles to make the cardboard conductive. For example, it may be coated with a colloidal suspension of carbon particles immersed in a suitable material such as alcohol or water. A colloidal suspension of carbon particles in water suitable for this purpose is known as "Aqua Dag" and a suitable colloidal suspension or particles in alcohol is known as "Dag 154."

The collector 108 is provided with an integral configuration in which various portions extend into the different ionization chambers. For example, the collector 108 is provided with a looped portion 110 (Figures 4 and 9) which is disposed in the detecting chamber 90 at an intermediate position in the chamber to attract charged particles within the chamber. A portion 112 extends horizontally across the looped portion 110 at the bottom of the looped portion. The portions 110 and 112 have a configuration corresponding substantially to that of the detecting chamber 90 so as to attract an optimum number of charged particles which are produced in the detecting chamber.

A leg 114 of the collector 108 extends upwardly in a curved configuration through the intermediate chamber 92 into the balance chamber 94. A second leg 116 also extends into the chamber 92 at an intermediate position between the front and back of the chamber and below the leg 114. The leg 116 has a sufficient length for disposition along substantially the complete length of the chamber at an intermediate position between the upper and lower walls of the chamber. A leg 118 is also disposed in the intermediate chamber at a position near the back of the chamber. The leg 118 is provided with a relatively short length so as to extend only through the open portion of the intermediate chamber at the high end of the scale 34.

Certain of the members described above including the batteries 40, 42, 44 and 46, the meter 62, the ionization chambers 90, 92 and 94 and the collector 108 are included in the circuitry shown in Figure 9. The collector 108 is electrically connected to the control grid of an electrometer tube 120, which may be a Type 5885. The cathode of the electrometer tube 120 is connected to the positive terminal of the battery 44, which may be considered as at ground potential and is shown in Figure 9 as being grounded. The cathode of the tube 120 is also connected to a resistance 122 having a suitable value such as approximately 33,000 ohms. The resistance 122 is in series with a resistance 124 and with the battery 42 between the cathode of the tube 120 and the detecting chamber 90. The battery is included in the series circuit such that its positive terminal has a common connection with the resistance 124, which may have a suitable value such as approximately 80,000 ohms.

Connections are made from the plate of the electrometer tube 120 to the balance chamber 94 and to the positive terminal of the battery 40. Resistances 126 and 128 and the batteries 44 and 46 are in series between the negative terminal of the battery 40 and the cathode of the tube 120. The resistances 126 and 128 may respectively have values of approximately 3.9 megohms and 6.2 megohms. A pair of resistances 130 and 132 are in series across the battery 40. The resistances 130 and 132 may be provided with values of 18 megohms and 15 megohms, respectively.

The batteries 44 and 46 are connected in series such that the negative terminal of the battery 44 and the positive terminal of the battery 46 have a common connection. The negative terminal of the battery 46 is connected to one of the electrical terminals 86, these terminals being adapted to be engaged by the fingers 82 as described above to form a switch. Connections are made from a second one of the electrical terminals 86 to the cathode of a tube 136 and from a third one of the terminals 86 to a resistance 140 having a suitable value such as approximately 36,000 ohms. The resistance 140 is connected at the other end to the balance chamber 90.

A resistance 142 having a suitable value such as approximately 10 ohms is connected between the cathodes of the tubes 136 and 120. The control grid of the tube 136 is adapted to receive the voltage on the common terminal between the resistances 126 and 128. The screen grid and plate of the tube 136 have a common connection with one terminal of the meter 62, the other terminal of which is connected to the positive terminal of the battery 42. The tube 136 may be a type 5886.

In order to place the apparatus described above into operation, the knob 72 (Figures 1 and 3) is first moved upwardly in the slot 74 provided in the side cover 20. As the knob 72 moves upwardly, it carries the actuator 76 with it. This causes the actuator 76 to press against the diaphragm 78 such that the diaphragm becomes tensioned toward the right in Figure 3. Because of the tensing force exerted on the diaphragm 78, the diaphragm presses the fingers 82 through the holes 84 in the cup 80 and into engagement with the electrical terminals 86. This causes the switch formed by the fingers 82 and the electrical terminals 86 to become closed.

When the switch formed by the fingers 82 and the terminals 86 has been closed, the apparatus constituting this invention is ready for operation to sense radioactive emanations in the vicinity of the apparatus. These radioactive emanations have sufficient energy to penetrate the walls of the various chambers and enter into the chambers. Upon entering into the chambers 90, 92 and 94, the radioactive emanations strike molecules of gas such as air with sufficient force to ionize the molecules into electrons and positive ions. The radioactive emanations also cause electrons to be emitted into the chambers by impinging on the electrons in the walls in the chambers as they move through the walls.

As will be seen from the discussion in the previous paragraph, the number of electrons and positive ions produced in each of the chambers 90, 92 and 94 by the penetration of radioactive emanations is dependent upon the volumes of the chamber and upon the areas of the walls defining the chambers. For this reason, a relatively large number of electrons and positive ions are produced in the detecting chamber 90. A slightly reduced number of electrons and positive ions are produced in the intermediate chamber 92. A slightly reduced number of electrons is produced in the intermediate chamber 92, even though the volume of the chamber is considerably greater than that of the detecting chamber 90. The reason for this is that the detecting chamber 90 has more effective wall surface than the intermediate chamber 92 for emitting electrons upon the passage of the radioactive emanations through the walls. Since a slightly greater number of electrons is produced by the radioactive emanations in the detecting chamber 90 than in the balanced chamber 92, the effective volume of the detecting chamber 90 can be considered as being slightly greater than the effective volume of the chamber 92. Actually, the effective volume of the detecting chamber 90 can be considered as slightly greater than the combined effective volumes of the chambers 92 and 94. Since the balance chamber 94 has a relatively small volume, only a small number of electrons and positive ions are produced in the chamber in comparison to the number of charged particles produced in the detecting chamber 90 and the intermediate chamber 92.

Charged particles produced in the various chambers are attracted to the collector 108. The particular polarity of the charged particles attracted in each chamber to the collector 108 is dependent upon the bias of the chamber relative to the collector. For all intensities of radioactivity, the detecting chamber 90 is biased at a negative voltage relative to the collector. This results from the fact that the detecting chamber 90 is connected to the negative terminal of the battery 42. The negative terminal of the battery 42 can be considered as at a potential negative with respect to ground since it is connected through the resistance 140 and the batteries 46 and 44 to the positive terminal of the battery 44, which is at ground.

At all intensities of radioactivity the potential on the balance chamber 94 is positive with respect to the potential on the collector 108 since it is connected to the positive terminal of the battery 40. At low intensities of radioactivity, the intermediate chamber 92 is at a negative potential with respect to the collector 108. The intermediate chamber 92 is at a negative potential at low intensities of radioactivity because of the large flow of current through the tube 120 at these intensities. This current flows through a circuit including the battery 40, the tube 120, the batteries 44 and 46 and the resistances 128 and 126. The current flowing through this circuit produces voltage drops across the resistances 128 and 126. These voltage drops are sufficiently great to cause the combined voltage drops across the batteries 44 and 46 and across the resistances 128 and 126 to be greater than the rise in voltage produced across the resistance 132 by the battery 40. For this reason, a negative voltage is introduced to the intermediate chamber 92 at low intensities of radioactivity.

The positive potential on the collector 108 relative to the potential on the chambers 90 and 92 at low intensities of radioactivity causes electrons produced in these chambers to be attracted toward the collector. Since the chambers 90 and 92 have relatively great volumes, a relatively large number of radioactive emanations penetrate the chambers and ionize molecules of gas into electrons and positive ions. Because of the great number of charged particles which are produced, a large number of electrons are attracted in the chambers 90 and 92 to the collector 108. In like manner, the positive voltage on the balance chamber 94 relative to the potential on the collector 108 causes positive ions in the chamber to be attracted toward the collector. However, only a relatively small number of positive ions are produced in the chamber 94 because of the small volume of the chamber such that only a small number of ions can move toward the collector 108. In this way, at low intensities of radioactivity the number of electrons moving toward the collector 108 is considerably greater than the number of positive ions moving toward the collector.

Because of the aiding action of the detecting chamber 90 and the intermediate chamber 92, the number of electrons moving toward the collector 108 varies considerably with small changes in the intensity of radioactivity. This causes the charge produced on the collector 108 to change appreciably with small changes in the intensity of radioactivity. The charge produced on the collector 108 is introduced to the control grid of the electrometer tube 120 to adjust the flow of current through the tube. For example, as the negative charge on the collector 108 increases with increased intensities of radioactivity, an increased negative bias is introduced to the control grid of the tube 120 to reduce the flow of current through the tube.

The current through the tube 120 flows through a circuit including the battery 40, the tube, the batteries 44 and 46 and the resistances 128 and 126. When the current flowing through this circuit decreases because of an increased negative bias on the control grid of the tube 120, reduced voltage drops are obtained across the resistances 128 and 126. This causes the voltage on the common terminal between the resistances 130 and 132 to rise so that a more positive voltage is introduced to the intermediate chamber 92. Because of this, the voltage gradient between the intermediate chamber 92 and the collector 98 decreases with increased intensities of radioactivity.

As described above, reduced voltage drops are produced across the resistances 128 and 126 when the current through the tube 120 decreases. These reduced voltage drops cause the voltage at the common terminal between the resistances 126 and 128 to rise. This rise in voltage causes the tube 136 to become more conductive such that an increased flow of current is obtained through a circuit including the battery 42, the meter 62, the tube 136, the fingers 86 and electrical terminals 82 and the resistance 140.

Because of the increased flow of current through the resistance 140, an increased voltage drop is produced across the resistance. This causes the voltage introduced to the detecting chamber 90 to become more negative with increased intensities of radioactivity. The increase in the negative voltage on the detecting chamber 90 might be expected to produce an increased flow of positive ions to the walls of the detecting chamber and therefore an increased flow of electrons to the collector 108. However, the walls of the detecting chamber 90 were previously biased with a sufficient negative voltage to produce an optimum flow of positive ions to the walls. For this reason, the increase in the negative voltage on the walls of the detecting chamber 90 has no appreciable effect on the flow of charged particles between the collector 108 and the detecting chamber 90.

As has been previously described, the current flow through the tube 106 and the resistance 140 also flows through the meter 62. When the current through these members increases because of an increased intensity of radioactivity, the pointer 26 on the meter becomes actuated in a clockwise direction in Figure 9 so as to produce an increased indication on the scale 34 in Figure 1. As the pointer 26 moves in a clockwise direction the radioactive material 66 on the pointer faces different positions in the intermediate chamber 92 and in the balance chamber 94.

At the low intensities of radioactivity, the radioactive emanations 66 from the pointer 26 are not able to penetrate into the intermediate chamber 92. This results from the fact that the plate 100 is interposed at the low end of the scale between the pointer 26 and the volume of the chamber 92. The emanations from the radioactive material 66 are not able to penetrate into the intermediate chamber 92 through the plate 100 since they constitute alpha particles. As is well known, alpha particles are large and heavy and have relatively low speeds. Because of this, they are able to be absorbed easily by a member such as the plate 100 as they travel into the plate.

At the low end of the scale 34, the emanations from the radioactive material 66 are able to penetrate into the balance chamber 94. The reason for this is that no barrier is presented between the pointer 66 and the volume occupied by the balance chamber. When the emanations from the radioactive material 66 penetrate the balance chamber 94 they strike molecules of gas in the chamber and produce electrons and positive ions. The electrons produced by ionization of gas molecules are attracted toward the walls of the balance chamber 94 because of the positive potential on the walls relative to the potential on the collector 108. The positive ions produced by the ionization of gas molecules are attracted toward the collector 108.

Since the positive ions produced in the balance chamber 94 travel toward the collector 108, the balance chamber 94 acts in opposition to the detecting chamber 90 and the intermediate chamber 92 at the low end of the scale 34. The opposing action produced by the balance chamber 94 increases with increased intensities of radioactivity. The reason for this is that the cross sectional area of the balance chamber 94 increases with increased indications on the scale 34. Since the cross sectional area of the balance chamber 94 increases, the emanations from the radioactive material 66 have an increased opportunity to strike molecules of gas during their movement through the chamber and to ionize the molecules into charged particles. Another reason is that an increasing length of the pointer 26 becomes positioned in front of the balance chamber 94 as the pointer swings in a clockwise direction. This results from the fact that the surface defining the bottom end of the balance chamber 94 has a greater curvature than the curvature representing the angular movement of the pointer 26.

The current flowing through the tube 120 continues to decrease as long as there is an unbalance in the number of electrons flowing to the collector 108 from the chambers 90 and 92 with respect to the number of positive ions flowing to the collector from the balance chamber 94. This decrease in current in turn causes the voltage on the common terminal between the resistances 126 and 128 to rise and accordingly causes a more positive bias to be introduced to the control grid of the tube 136. Because of the positive increase in the bias on the control grid of the tube 136, the current flowing through the tube 136 and the meter 62 increases so as to produce movement of the pointer 26 in a clockwise direction for increasing the indication of the pointer on the scale 34. For this reason, the movement of the pointer 26 continues until the electrons flowing to the collector 108 from the chambers 90 and 92 become balanced by the positive ions flowing to the collector from the chamber 94. In this way, the meter 62 and especially the pointer 26 on the meter serve as devices for sensing the intensity of radioactivity. The pointer 26 actually provides an indication of the intensity of radioactivity by the positioning of the pointer relative to the scale 34.

As previously described, the negative potential on the walls of the intermediate chamber 92 becomes reduced as the intensity of radioactivity increases. For this reason, a reduced number of electrons in the intermediate chamber 92 become attracted toward the collector 108 as the intensity of radioactivity increases. Since a number of electrons flowing in the chamber 92 toward the collector 108 becomes reduced, the sensitivity of response of the tubes 120 and 136 and of the meter 62 becomes reduced. By gradually reducing the sensitivity of response of the meter 62 as the intensity of radioactivity increases, the response can be made to approach a logarithmic basis.

As the intensity of radioactivity continues to increase, the negative bias produced on the collector 108 rises. This negative bias is introduced to the control grid of the tube 120 to reduce the flow of current through the tube. As previously described, the current flowing through the tube 120 also passes through the batteries 44 and 46, the resistances 128 and 126 and the battery 40. When the current flowing through this circuit becomes sufficiently low, the voltage drops produced across the resistances 128 and 126 approach a value such as approximately one volt. This causes a total voltage drop of approximately seven volts to be obtained from the positive terminal of the battery 44 to the negative terminal of the battery 40 such that the negative terminal of the battery 40 would be approximately seven volts below ground. Because of the voltage dividing action produced by the resistances 130 and 132 with respect to the potential on the battery 40, a rise of approximately seven volts is produced across the resistance 132. This causes the common terminal between the resistances 130 and 132 to be at approximately ground potential. This potential is introduced to the intermediate chamber 92.

Since the intermediate chamber 92 is at approximately ground potential in the intermediate range of radioactive intensities, the potential of the battery 40 may be critical in this range. The reason is that a slight variation of potential of the intermediate chamber 92 in the negative direction would cause ions to flow toward the collector. Similarly, a slight variation of potential on the intermediate chamber 92 in a positive direction would cause electrons to flow toward the collector. For this reason, it is desirable to use a battery with stable and regulated characteristics as the batery 40, at least when intermediate intensities of radioactivity are being measured.

When the intensity of radioactivity becomes relatively high, the negative charge produced on the collector 108 becomes sufficiently high to control the flow of only a relatively low current through the tube 120. This low current causes relatively low voltages to be produced across the resistances 128 and 126. The voltages produced across the resistances 128 and 126 are so low that the positive voltage produced across the resistance 132 by the battery 40 is greater than the combined negative voltages across the batteries 44 and 46 and the resistances 128 and 126. This causes the voltage at the common terminal between the resistances 132 and 130 to become positive with respect to the voltage on the collector 108. This positive voltage is introduced to the intermediate chamber 92 to control the flow of charged particles through the chamber.

Because of the positive voltage on the walls of the intermediate chamber 92 at high intensities of radioactivity, electrons produced in the chamber are attracted toward the walls of the chamber. At the same time, positive ions produced in the chamber are attracted toward the collector 108. This causes the intermediate chamber 92 to act with the balance chamber 94 in opposing the action of the detecting chamber 90 at high intensities of radioactivity. As will be seen, the intermediate chamber 92 acts to oppose the detecting chamber 90 at high intensities of radioactivity, even though it acts to aid the detecting chamber 90 at low intensities of radioactivity.

It has been previously described that the effective volume of the detecting chamber 90 is slightly greater than the combined effective volumes of the intermediate chamber 92 and the balance chamber 94. For this reason, the negative charges produced on the collector 108 increase slightly with increases in the intensity of radioactivity at the high end of the scale 34 in Figure 1. These slight increases in the negative charge on the collector 108 cause the current flowing through the tube 120 to be correspondingly reduced in a manner similar to that described above. Upon a reduction in the current flowing through the tube 120, the voltage at the common terminal between the resistances 126 and 128 rises in a manner similar to that described above to produce a more positive bias on the control grid of the tube 136.

Upon a rise of potential on the control grid of the tube 136, an increased current flows through a circuit including the battery 42, the meter 62, the tube 136, the fingers 86 and the terminals 82 and the resistance 140. This increased current causes the pointer 26 in the meter 62 to become actuated in a clockwise direction to indicate an increased intensity of radioactivity on the scale 34 in Figure 1. At the high end of the scale 34, the pointer 26 has moved past the end of the balance chamber 94 so that emanations from the radioactive material 66 cannot enter the chamber. In this way, the chamber 94 cannot act at high intensities of radioactivity to produce a charge for balancing the charge travelling to the collector 108 from the detecting chamber 90.

As has been previously described, the plate 100 covers only a portion of the intermediate chamber 92 at the rear end of the chamber. At high intensities of radioactivity, the intermediate chamber 92 is open so that emanations from the radioactive material 66 on the pointer 26 can penetrate into the chamber to ionize molecules of gas into electrons and positive ions. At the high end of the scale 34, the cross sectional area of the chamber 92 is relatively large. This causes a relatively large number of molecules to become ionized by the emanations from the radioactive meter 62. Furthermore, a relatively great number of emanations from the radioactive material 66 are able to pass into the chamber 92 since the pointer 26 has most of its length positioned in contiguous relationship to the chamber. This results from the fact that the curved surface defining the upper end of the intermediate chamber 92 slopes downwardly at an angle greater than that defined by the angular movement of the pointer 26. Because of this downward slope in the chamber 92, an increasing length of the pointer 26 becomes positioned in front of the chamber so that an increasing number of radioactive emanations can enter into the chamber to ionize molecules of gas in the chamber.

It will be seen from the discussion in the previous paragraph that the number of electrons and positive ions produced by the emanations from the radioactive material 66 are considerably greater for high intensities of radioactivity than for low intensities of radioactivity. The positive ions produced in the intermediate chamber 92 by the emanations from the radioactive material 66 are attracted toward the collector 108 since the collector is at a negative potential with respect to the walls of the intermediate chamber 92. This causes the negative charge on the collector 108 to become quickly balanced. In this way, the pointer 26 has to be actuated through only a small distance in a clockwise direction to produce a balance of charges on the collector 108. Because of the small distance through which the pointer 26 has to travel in order to obtain a balance of charges on the collector 108, the scale 34 is relatively contracted at the high end in comparison to its calibration at the low end. This facilitates a logarithmic calibration of the scale 34.

It has been previously described that it may be desirable to maintain the potential from the battery 40 substantially constant, at least in the intermediate range of radioactive intensities. The reason for this is that the potential on the intermediate chamber 92 may vary between positive and negative voltages with respect to the potential on the collector 108 in the intermediate range of intensities. In the low and high ranges of radioactive intensities, however, the polarity of the potential on the intermediate chamber 92 remains constant even with some variations in the potential from the battery 40. Because of this, the potential of the battery 40 is not critical at low and high intensities of radioactivity. Since accurate readings at the low and high intensities of radioactivity are perhaps more important than in the intermediate range, reliable indications might be obtained at any intensity of radioactivity even though the battery 40 did not have completely stable characteristics.

As the intensity of radioactivity increases, the current through the tube 120 tends to decrease such that the voltage on the common terminal between the resistances 130 and 132 tends to rise. This causes the potential on the walls of the ionization chamber 92 to rise. This has been described in detail previously. The rise in potential on the walls of the intermediate chamber 92 tends to be transferred to the collector 108 because of the distributed capacity between the walls of the chamber and the collector. Because of the action of the distributed capacity, an action is produced which tends to oppose the response of the various members including the meter 62 to the intensity of radioactivity. This response is only in the nature of a delaying action since the meter 62 eventually becomes actuated to its proper position in spite of any opposing action which may be exerted by the distributed capacitance between the walls of the chamber 92 and the collector 108.

When the current through the tube 120 decreases with increased intensities of radioactivity, the voltage at the common terminal between the resistances 126 and 128 rises. This rise in voltage is introduced to the grid of the tube 136 to produce an increased flow of current through the tube and an increased voltage drop across the resistance 140. The increased voltage drop across the resistance 140 in turn causes the potential on the detecting chamber 90 to become more negative with respect to the potential on the collector 108. This has been described in detail previously.

Because of the distributed capacitance between the walls of the detecting chamber 90 and the collector 108, the decrease in the potential on the chamber 90 tends to become transferred to the collector 108. By making the collector 108 more negative, the response of the tubes 120 and 136 and of the meter 62 tends to become accelerated. The distributed capacity between the collector 108 and the detecting chamber 90 acts only to speed up the response of the meter 62 but does not affect appreciably the eventual positioning of the pointer 26 in the meter. The reason for this is that the distributed capacity becomes charged to a substantially constant value when the intensity of radioactivity remains constant. Since the distributed capacity is charged to a substantially constant value, it does not influence the movement of the pointer 26 so that the pointer can reach a substantially constant displacement.

It is desirable for the sensing device such as the meter 26 to respond as quickly as possible to changes in the intensity of radioactivity. This is especially true since radioactivity can be harmful or even fatal to a person when he has been exposed to the radioactivity in excessive quantities. However, if the response of the meter 62 is too fast, the pointer 26 in the meter may tend to hunt. Hunting is undesirable because the continued movements of the meter 62 prevent an accurate reading from being obtained.

A fast response of the meter 62 without hunting can be obtained by adjusting the values of the distributed capacitances between the collector 108 and the different ionization chambers. For example, a fast response of the meter 62 can be obtained by increasing the distributed capacitance between the collector 108 and the walls of the detecting chamber 90. A damping action to prevent hunting can be obtained by increasing the distributed capacitance between the collector 108 and the walls of the intermediate chamber 92.

The speed of response of the meter 62 remains substantially constant throughout the full range of radioactive intensities measured by the meter. The reason for this is that the current per effective unit of volume remains substantially constant throughout the full range of radioactive intensities. The "effective" volume of the chambers 90, 92 and 94 at a particular intensity of radioactivity may be defined as that volume which acts to produce electrons on the collector 108 and includes the action of the walls of the chambers in producing charged particles as previously described.

The production of a substantially constant current per unit of effective volume may be seen in part from the fact that a large effective volume is obtained at low intensities of radioactivity. The reason for this is that the large volumes of the detecting chamber 90 and the intermediate chamber 92 tend to aid each other at the low intensities of radioactivity. Because of the aiding action of the chambers 90 and 92 at low intensities of radioactivity, the current per unit of effective volume is low even though the total current flowing through the electrometer tube 20 is relatively large at these intensities.

At high intensities of radioactivity, the intermediate chamber 92 acts to oppose the detecting chamber 90. Since the combined effective volumes of the intermediate chamber 92 and the balance chamber 94 are only slightly less than that of the detecting chamber 90, the combined effective volume of all of the chambers is relatively small at high intensities of radioactivity. Furthermore, the current tending to flow through the electrometer tube 120 at high intensities of radioactivity is relatively small for reasons which have been described in detail previously. Since both the current and the effective volume of all of the chambers are small at high intensities of radioactivity, the current per unit of effective volume tends to remain relatively low.

The apparatus described above has several important advantages. It provides an accurate sensing as to the intensity of radioactivity over a wide range of values. The apparatus provides such reliable indications by balancing the charges produced by various chambers included in the apparatus. The apparatus operates to indicate the radioactive intensities on a desirable scale such as a logarithmic scale by including an additional ionization chamber. This chamber acts to produce an aiding action at first intensities of radioactivity and to produce an opposing action at second intensities of radioactivity.

Reliable indications as to the intensity of radioactivity are also obtained in part because of the action of the sensing device such as the meter 62 in producing charged particles in certain of the chambers. These charged particles are produced in a number dependent upon the actuation of the sensing device. The charged particles are used to provide a balancing action to prevent any further actuation of the sensing device when the sensing device has been moved to a position of proper indication.

I claim:

1. Apparatus for sensing the intensity of radioactivity, including, a first ionization chamber disposed to receive radioactive emanations for the production of a number of charged particles by the radioactive emanations in accordance with the number of emanations received by the ionization chamber, a second ionization chamber disposed to receive radioactive emanations for the production of a number of charged particles by the radioactive emanations in accordance with the number of emanations received by the ionization chamber, a collector biased to receive charged particles of the same polarity from the first and second chambers at low intensities of radioactivity and to receive charged particles of the opposite polarity from the first and second chambers at high intensities of radioactivity, means for sensing the charges received by the collector, and means associated with the sensing means for producing a charge variable with the actuation of the sensing means to balance the charge on the collector.

2. Apparatus for sensing the intensity of radioactivity, including, a first ionization chamber disposed to receive the radioactivity for the production of a number of charged particles in accordance with the intensity of the radioactivity, a second ionization chamber disposed to receive the radioactivity for the production of a number of charged particles in accordance with the intensity of the radioactivity, means for receiving charged particles of a first polarity from the first chamber for the production of a first signal having a first polarity and having an intensity dependent upon the number of charged particles produced in the chamber and for receiving charged particles from the second chamber for the production of a second signal which has an intensity dependent upon the number of charged particles produced in the second chamber and which has the first polarity for first intensities of radioactivity and which has an opposite polarity for second intensities of radioactivity, means for producing a third signal for balancing the first and second signals produced on the last mentioned means, and means associated with the balancing means for sensing the intensity of radioactivity.

3. Apparatus for sensing the intensity of radioactivity, including, a first ionization chamber disposed to receive radioactive emanations and for the production of a number of charged particles in accordance with the number of emanations received by the ionization chamber, a second ionization chamber disposed to receive radioactive emanations for the production of a number of charged particles in accordance with the number of emanations received by the ionization chamber, a collector biased relative to the chambers to attract charged particles of a first polarity from the first chamber and to attract charged particles from the second chamber, means including an electrometer electrically coupled to the collector to receive charged particles from the collector for the production of a variable voltage between the collector and the second ionization chamber to obtain a movement of charged particles of the first polarity in the second ionization chamber to the collector at low intensities of radioactivity and to obtain a movement of charged particles of an opposite polarity in the second ionization chamber to the collector at high intensities of radioactivity, and means for sensing the signals produced by the electrometer.

4. Apparatus for sensing the intensity of radioactivity, including, a plurality of chambers containing gas capable of being ionized by radiation of the character issuing from radioactive materials, a collector in electrical communication with the chambers, means for creating a potential gradient within a first one of the chambers in the plurality in one direction with respect to the collector, means for creating a potential gradient within a second one of the chambers in the plurality in the opposite direction with respect to the collector, means controlled by the collector upon variations in the potential thereof for varying the radiation-induced ionization of the gas in the first chamber with respect to the radiation-induced ionization of the gas in the second chamber in a direction to reduce to a null point the current flowing to the collector, and means for creating a potential gradient within a third one of the chambers in the plurality in one direction with respect to the collector for radiation values of low intensity and in the opposite direction with respect to the collector for radiation values of high intensity to produce a different sensitivity of collector response at the low intensities than at the high intensities.

5. Apparatus for sensing the intensity of radioactivity, including, a first ionization chamber disposed to receive radiation from material external to the chamber for the production of charged particles, a second ionization chamber disposed to receive radiation from material external to the chamber for the production of charged particles, a third ionization chamber disposed to receive radiation from material external to the chamber for the production of charged particles, a collector disposed in electrical communication with the first, second and third ionization chambers and biased to receive charged particles of a first polarity from the first ionization chamber and to receive charged particles of a second polarity from the second ionization chamber and to receive charged particles of the first polarity from the third ionization chamber at low intensities of radioactivity and charged particles of the second polarity from the third ionization chamber at high intensities of radioactivity, and means including electrical circuitry electrically coupled to the collector and the charged particles from the second chamber for varying the charge produced on the collector by the second chamber to produce a balance in the charges produced on the collector by the charged particles from the first, second and third ionization chambers and to obtain a different sensitivity of response of the sensing apparatus for low intensities of radioactivity than for high intensities of radioactivity.

6. Apparatus for sensing the intensity of radioactivity, including, a first ionization chamber disposed to receive radioactive emanations from materials external to the chamber for the production of charged particles in accordance with the number of radioactive emanations received by the chamber, a second ionization chamber disposed in contiguous relationship to the first ionization chamber to receive radioactive emanations for the production of charged particles in accordance with the number of radioactive emanations received by the chamber, a third ionization chamber disposed in contiguous relationship to the first and second ionization chambers to receive radioactive emanations for the production of charged particles in accordance with the number of radioactive emanations received by the chamber, a collector disposed in electrical communication with the ionization chambers to receive charged particles produced in the different chambers, means for biasing the chambers relative to one another and to the collector to produce opposite actions with respect to the polarity of the charged particles attracted to the collector from the first and second chambers and to produce opposite actions with respect to the polarity of the charged particles attracted to the collector from the third chamber at first and second intensities of radioactivity, radioactive means variably positioned to sense the intensity of radioactivity, the second chamber having characteristics for the production of variable numbers of charged particles with changes in the positioning of the radioactive means, and means including an electrometer electrically coupled to the collector and the radioactive means for producing changes in the positioning of the radioactive means in accordance with any unbalance produced in the charges on the collector by the charged particles from the different ionization chambers.

7. Apparatus for indicating the intensity of radioactivity, including, a first ionization chamber disposed to receive radiation from materials external to the apparatus for the production of charged particles in a number corresponding to the intensity of radioactivity, a second ionization chamber disposed to receive radiation from materials external to the chamber for the production of charged particles in a number corresponding to the intensity of radioactivity, a third ionization chamber disposed to receive radiations from materials external to the apparatus for the production of charged particles in a number corresponding to the intensity of radioactivity, a collector disposed in electrical communication with the first, second and third ionization chambers and biased relative to the chambers to receive charged particles of a first polarity from the first chamber and charged particles of an opposite polarity from the second chamber and to receive charged particles of the first polarity from the third chamber for low intensities of radioactivity and charged particles of the second polarity from the third chamber for high intensities of radioactivity, means including adjustably positioned means associated with the collector and the second ionization chamber for introducing radioactive emanations to the chamber to obtain the production of charged particles in the chamber and for obtaining a variation in the number of particles ionized in the second ionization chamber in accordance with the charge received by the collector from the various ionization chambers to produce a balance in the charges provided on the collector by the chambers, and means for sensing the intensity of radioactivity in accordance with the positioning of the last mentioned means.

8. Apparatus for sensing the intensity of radioactivity, including a first ionization chamber disposed to receive external radiation for the production of charged particles in a number corresponding to the intensity of the external radiation, a second ionization chamber disposed to receive external radiation for the production of charged particles in a number corresponding to the intensity of the external radiation, a third ionization chamber disposed to receive external radiation for the production of charged particles in a number corresponding to the intensity of the external radiation, a collector common to the first, second and third chambers to receive charged particles from the chambers in accordance with the potentials of the collector relative to the chambers, means for creating potentials of a first polarity on the collector relative to the potentials on the first and second chambers for first intensities of radioactivity and potentials of a second polarity on the collector relative to the potentials on the third chamber for the first intensities of radioactivity and for creating potentials of the first polarity on the collector relative to the potentials on the first chamber for second intensities of radioactivity and potentials of the second polarity on the collector relative to the potentials on the second and third chambers for the second intensities of radioactivity, and means including sensing means for producing a balance of charges on the collector at the different intensities of radioactivity to obtain a different sensitivity of response at the first intensities of radiation than at the second intensities of radioactivity.

9. Apparatus for sensing the intensity of radioactivity, including, a first ionization chamber disposed to receive radioactivity for the production of charged particles in a number related to the intensity of radioactivity, a second ionization chamber shaped to provide an increasing cross-sectional area with increases in distance in a first direction, this increasing cross-sectional area being in a direction transverse to the first direction, the second chamber being disposed to receive radioactivity for the production of charged particles in a number related to the intensity of radioactivity and to the cross-sectional area a third ionization chamber disposed to receive radioactivity for the production of charged particles in a number related to the intensity of radioactivity, a collector disposed in electrical communication with the chambers and biased to receive charged particles of a first polarity from the first and third chambers and of a second polarity from the second chamber for first intensities of radioactivity and to receive charged particles of the first polarity from the first chamber and of the second polarity from the second and third chambers for second intensities of radioactivity, an indicator movable in the first direction and disposed in contiguous relationship to the second ionization chamber, radioactive means on the indicator for producing an ionization of particles in the second chamber in accordance with the positioning of the indicator, and means operative in accordance with the charge on the collector to produce variations in the positioning of the indicating means for a balancing of the charges received by the collector from the different ionization chambers.

10. Apparatus for sensing the intensity of radioactivity, including, a first ionization chamber for receiving radioactive emanations for the production of a signal related to the intensity of the radioactive emanations, a second ionization chamber for receiving radioactive emanations for the production of a signal related to the intensity of radioactive emanations, an indicator responsive to the signals produced by charged particles in the first and second ionization chambers, a pointer on the indicator, there being material on the pointer for producing radioactive emanations, means for biasing the first and second chambers to obtain the collection of charged particles of the same polarity from the chambers for first intensities of radioactivity and to obtain the collection of charged particles of one polarity from the first chamber and of an opposite polarity from the second chamber for second intensities of radioactivity, a third ionization chamber, the second and third ionization chambers being responsively disposed relative to the radioactive material on the pointer at different intensities of radioactivity for the production of signals in accordance with the deflection of the pointer at the different intensities of radioactivity, means for biasing the first and third chambers to obtain the collection of charged particles of one polarity from one of the chambers and of the opposite polarity from the other chamber, and means for deflecting the pointer on the indicator in accordance with any differences in the number of collected charged particles of the first polarity and of the second polarity to minimize such differences in the collected charge.

11. Apparatus for sensing the intensity of radioactivity, including, an electrometer, a meter connected to the electrometer to receive the current flowing through the electrometer, a pointer disposed in the meter for actuation in accordance with the current flowing through the meter, a collector connected to the electrometer to bias the electrometer in accordance with the charge on the collector for the establishment of an electrical current dependent upon the charge, a first ionization chamber disposed to receive radioactivity for the production of charged particles in a number proportional to the intensity of the radioactivity, a second ionization chamber positioned in contiguous relationship to the pointer over at least a first portion of the movement followed by the pointer and disposed to receive radioactivity for the production of charged particles in a number proportional to the intensity of radioactivity, a third ionization chamber positioned in contiguous relationship to the pointer over at least a second portion of the movement followed by the pointer and disposed to receive radioactivity for the production of charged particles in a number proportional to the intensity of radioactivity, the collector being disposed between the ionization chambers and being biased relative to the chambers to receive charged particles of one polarity from the first and second chambers and of the opposite polarity from the third chamber for low intensities of radioactivity and to receive charged particles of the first polarity from the first chamber and of the opposite polarity from the second and third chambers for high intensities of radioactivity for a variation in the charges produced on the collector at the different intensities of radioactivity, and means on the pointer for producing a different number of charged particles in the second and third chambers in accordance with the actuation of the pointer to produce a balance in the charges on the collector.

12. Apparatus for indicating the intensity of radiation, including, a first ionization chamber disposed to receive radioactive emanations for the production of charged particles in a number dependent upon the number of radioactive emanations, a collector electrically coupled to the chamber and biased relative to the chamber to receive charged particles of a first polarity from the chamber, a second ionization chamber disposed to receive radioactive emanations for the production of charged particles in a number dependent upon the number of radioactive emanations, the collector being electrically coupled to the second ionization chamber and being biased relative to the chamber to receive charged particles of a polarity opposite to the first polarity from the ionization chamber, a third ionization chamber disposed to receive radioactive emanations for the production of charged particles in a number dependent upon the number of radioactive emanations, the collector being electrically coupled to the third ionization chamber and being biased relative to the chamber to receive charged particles of the first polarity from the chamber for low intensities of radioactivity and charged particles of the second polarity from the chamber for high intensities of radioactivity, means including an indicator responsive to the charges produced on the collector for a positioning of the indicator in contiguous relationship to the second ionization chamber for low intensities of radioactivity and in contiguous relationship to the third ionization chamber for high intensities of radioactivity, means on the indicator for producing charged particles in the second and third ionization chambers in accordance with the positioning of the indicator relative to the chamber, and means electrically coupled to the collector and the indicator for producing a movement of the indicator relative to the second and third ionization chambers until the occurrence of a balance in the charges produced on the collector by the charged particles in the ionization chambers.

13. Apparatus for sensing the intensity of radioactivity, including, a first ionization chamber disposed to receive radioactivity for the production of charged particles in a number dependent upon the intensity of radioactivity, a second ionization chamber disposed to receive radioactivity for the production of charged particles in a number dependent upon the intensity of radioactivity, a third ionization chamber disposed to receive radioactivity for the production of charged particles in a number dependent upon the intensity of radioactivity, a collector disposed in electrical communication with the ionization chambers to receive charged particles produced in the different chambers, an electrometer connected to the collector to receive a bias voltage in accordance with the charge on the collector for a control over the flow of current through the collector, means including a plurality of resistances connected in a circuit with the electrometer for the production of voltages in accordance with the flow of current through the electrometer, the second ionization chamber being connected to the resistances for the attraction of charged particles of a first polarity from the chamber to the collector at low intensities of radioactivity and for the attraction of charged particles of a second polarity from the chamber to the collector at high intensities of radioactivity, the third ionization chamber being connected to the resistances for the attraction of charged particles of the second polarity from the chamber to the collector, and indicator having a movable pointer disposed in contiguous relationship to the second and third chambers for an actuation of the pointer in accordance with the flow of current through the indicator, there being on the pointer radioactive material for producing a variable number of charged particles in the second and third ionization chambers in accordance with the disposition of the pointer relative to the chambers, and means connected to the resistances and connected in a circuit with the indicator for producing a flow of current through the indicator in accordance with the voltages produced across the resistances to obtain a variation of the charged particles attracted to the collector from the different chambers for a balance of the charges on the collector, the first ionization chamber being connected to the indicator circuit for the attraction of charged particles of the first polarity from the chamber to the collector.

14. Apparatus for sensing the intensity of radioactivity, including, a first ionization chamber disposed to receive radioactivity for the production of charged particles in a number dependent upon the intensity of radioactivity, a second ionization chamber disposed in contiguous relationship to the first chamber to receive radioactivity for the production of charged particles in a number dependent upon the intensity of radioactivity, a third ionization chamber disposed in contiguous relationship to the first and second chambers to receive radioactivity for the production of charged particles in a number dependent upon the intensity of radioactivity, a collector having portions common to the first, second and third chambers to receive charged particles from the chambers in accordance with the potential of the collector relative to the chambers for the production on the collector of negative potentials having magnitudes increasing with the intensity of radioactivity, an electrometer connected to the collector to provide a decreasing flow of current in accordance with increases in the magnitude of the negative potential on the collector, means including a plurality of resistances connected in a series circuit with the electrometer for the production of voltages across the resistances in accordance with the flow of current through the electrometer, a voltage source connected across a particular pair of resistances in the plurality, the second ionization chamber being connected to the resistances in the particular pair to bias the chamber for a flow of charged particles of a first polarity from the chamber to the collector at low intensities of radioactivity and for a flow of charged particles of a second polarity from the chamber to the collector at high intensities of radioactivity, the third ionization chamber being connected to the electrometer for a flow of charged particles of the second polarity from the chamber to the collector, a current control member connected to the resistances in the plurality to produce an increasing flow of current in accordance with decreases in the flow of current through the electrometer, the first ionization chamber being connected to the indicator circuit for a flow of charged particles of the first polarity from the chamber to the collector, and an indicator having a movable pointer disposed in contiguous relationship to the second and third chambers and connected in a circuit with the current control member for actuation of the pointer in accordance with the flow of current in the control member, there being on the pointer radioactive material for producing a variable number of charged particles in the second and third ionization chambers in accordance with the disposition of the pointer relative to the chambers to obtain a balance of charges on the collector.

15. Apparatus as set forth in claim 13 in which the second ionization chamber is constructed to receive radioactivity from the material on the pointer only for high indications by the pointer and in which the third ionization chamber is constructed to receive radioactivity from the material on the pointer only for low indications by the pointer.

16. Apparatus as set forth in claim 14 in which the second ionization chamber is constructed and disposed relative to the radioactive material on the pointer to reject radioactivity from the material at low indications from the pointer and to receive an increasing amount of radioactivity with increases in indication at high indications from the pointer for an increasing production of charged particles in the chamber with increases in indication and in which the third ionization chamber is disposed to receive radioactivity from the material on the pointer only for low indications by the pointer and is provided with an increasing transverse cross-sectional area with increases in indications by the pointer for an increasing production of charged particles with increases in indication.

17. Apparatus as set forth in claim 16 in which a second voltage source is connected in the circuit with the first voltage source, the electrometer and the resistances to bias the first ionization chamber for the flow of charged particles of the first polarity to the collector and to bias the third ionization chamber for the flow of charged particles of the second polarity to the collector.

References Cited in the file of this patent

UNITED STATES PATENTS

| | | |
|---|---|---|
| 2,610,302 | Christian | Sept. 9, 1952 |
| 2,733,356 | Ragosine | Jan. 31, 1956 |